:# 3,530,132
WATER-INSOLUBLE ANTHRAQUINONE DYESTUFFS

Jean-Frédéric Guye-Vuilleme, Basel, Switzerland, assignor to Ciba Limited, Basel, Switzerland, a Swiss company
No Drawing. Filed Feb. 3, 1967, Ser. No. 613,766
Claims priority, application Switzerland, Feb. 10, 1966, 1,867/66; Dec. 28, 1966, 18,777/66
Int. Cl. C07d 51/70
U.S. Cl. 260—268
9 Claims

ABSTRACT OF THE DISCLOSURE

Water-insoluble anthraquinone dyestuffs of the formula

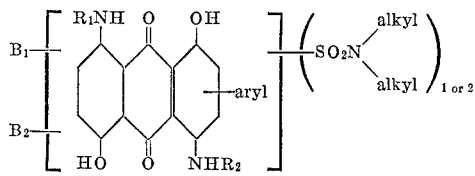

wherein $R_1$ and $R_2$ each represents hydrogen or alkyl and $B_1$ and $B_2$ each represents alkyl, hydrogen or halogen.

---

The present invention provides water-insoluble anthraquinone dyestuffs of the formula

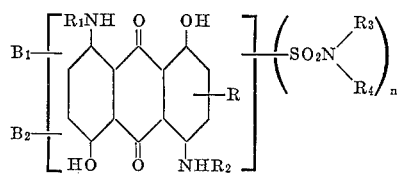

in which formula $n$ is 1 or 2, preferably 1, R represents an aryl residue which is preferably substituted, especially a benzene residue containing at least one acyloxy, aryloxy, hydroxy or alkoxy group in the ortho-position or the para-position to the anthraquinone residue or a fused heterocyclic five-membered or six-membered ring bound at the para-position through a sulphur atom or an oxygen atom, $R_1$ and $R_2$ each represents a hydrogen atom or an alkyl residue which may be substituted, for example, by one or more hydroxy, alkoxy, acyloxy or aryl groups, $R_3$ represents a hydrogen atom or an alkyl group, a cycloalkyl group, a phenylalkyl group or a phenyl group which may be substituted and $R_4$ represents a hydrogen atom or an alkyl group, a cycloalkyl group or a phenalkyl group which may be substituted, and in which the residues $R_3$ and $R_4$ may also form a heterocyclic ring together with the nitrogen atom, and $B_1$ and $B_2$ each represent alkyl residues which may be substituted, halogen atoms or especially hydrogen atoms.

The present invention also provides a process for the manufacture of water-insoluble anthraquinone dyestuffs of the above formula or mixtures thereof, which comprises reacting a compound of the formula

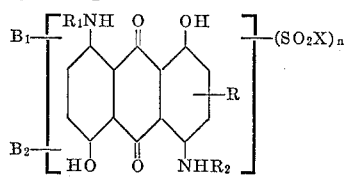

or mixtures thereof, in which formula X represents a halogen atom, with one or more amines of the formula $NHR_3R_4$.

The preferred starting materials are sulphonic acid chlorides. These are obtainable by reacting the appropriate 1,5-dihydroxy-4,8-diamino-2-aryl-, especially -2-phenyl-anthraquinone with chlorosulphonic acid. The following dihydroxydiaminoanthraquinones may be mentioned as examples of compounds to be reacted with chlorosulphonic acid:

1,5-dihydroxy-4,8-diamino-2- or 3-(4'-hydroxyphenyl)-anthraquinone,
1,5-dihydroxy-4,8-diamino-2- or 3(4'-hydroxy-3'-chlorophenyl)-anthraquinone,
1,5-dihydroxy-4,8-diamino-2- or 3-(4'-methoxyphenyl)-anthraquinone,
1,5-dihydroxy-4,8-diamino-2- or 3(4'-hydroxy-3'-methylphenyl)-anthraquinone,
1,5-dihydroxy-4,8-diamino-2- or 3-(4'-hydroxyl-2'-methylphenyl)-anthraquinone,
1,5-dihydroxy-4,8-diamino-2- or 3-(2'-hydroxy-5'-methylphenyl)-anthraquinone,
1,5-dihydroxy-4,8-diamino-2-or 3-(2'-hydroxy-5'-ethylphenyl)-anthraquinone,
1,5-dihydroxy-4,8-diamino-2- or 3-(4'-hydroxy-3'-amyl-phenyl)-anthraquinone,
1,5-dihydroxy-4,8-diamino-2- or 3-(2'-hydroxy-5'-amylphenyl)-anthraquinone,
1,5-dihydroxy-4,8-diamino-2- or 3-(2'-hydroxy-5'-octylphenyl)-anthraquinone,
1,5-dihydroxy-4,8-diamino-2- or 3-(2'-hydroxy-5'-cyclohexylphenyl)-anthraquinone,
1,5-dihydroxy-4,8-diamino-2- or 3-(4'-hydroxy-3'-phenylphenyl)-anthraquinone,
1,5-dihydroxy-4,8-diamino-2- or 3-(2'-hydroxy-5'-phenylphenyl)-anthraquinone,
1,5-dihydroxy-4,8-diamino-2- or 3-(4'-hydroxy-3',5'-dimethylphenyl)-anthraquinone,
1,5-dihydroxy-4,8-diamino-2- or 3-(3',4'-dimethoxyphenyl)-anthaquinone,
1,5-dihydroxy-4,8-diamino-2- or 3-(2',5'-dimethoxyphenyl)-anthraquinone,
1,5-dihydroxy-4,8-diamino-2- or 3-(4'-benzyloxy)-phenylanthraquinone,
1,5-dihydroxy-4,8-diamino-2- or 3-(4'-hydroxy-3'-methoxyphenyl)-anthraquinone,
1,5-dihydroxy-4,8-diamino-2- or 3-(3',4'-dihydroxyphenyl)-anthraquinone,
1,5-dihydroxy-4,8-diamino-2- or 3-(2',4'-dihydroxyphenyl)-anthraquinone,
1,5-dihydroxy-4,8-diamino-2-or 3-(2',5'-dihydroxyphenyl)-anthraquinone,
1,5-dihydroxy-4,8-diamino-2- or 3-(2',4',6'-trihydroxyphenyl)-anthraquinone,
1,5-dihydroxy-4,8-diamino-2- or 3-(4'-phenoxyphenyl)-anthraquinone,
1,5-dihydroxy-4,8-diamino-2- or 3-(2'-hydroxynaphthyl-1')-anthraquinone,
1,5-dihydroxy-4,8-diamino-2- or 3-(4'-hydroxynaphthyl-1')-anthraquinone,
1,5-dihydroxy-4-amino-8-methylamino-2- or 3-(4'-hydroxyphenyl)-anthraquinone,
1,5-dihydroxy-4,8-dimethylamino-2- or 3-(4'-hydroxyphenyl)-anthraquinone,
1,5-dihydroxy-4-amino-8-hydroxyethylamino-2- or 3-(4'-hydroxyphenyl)-anthraquinone,
1,5-dihydroxy-4-hydroxyethylamino-8-amino-2- or 3-(4'-hydroxyphenyl)-anthraquinone,
1,5-dihydroxy-4-amino-8-acetoethylamino-2- or 3-(4'-methoxyphenyl)-anthraquinone,
1,5-dihydroxy-4-amino-8-benzoyloxyethylamino-2- or 3-(4'-hydroxyphenyl)-anthraquinone,
1,5-dihydroxy-4,8-diamino-6-(or 7)-bromo-2- or 3-(4'-hydroxyphenyl)-anthraquinone,
1,5-dihydroxy-4,8-diamino-6-(or 7)-bromo-2- or 3-(4'-methoxyphenyl)-anthraquinone, 1,5-dihydroxy-4,8-diamino-2- or 3-(4'-hydroxy-3'-(or 2')-bromophenyl)-anthraquinone, 1,5-dihydroxy-4,8-diamino-2- or 3-(4'-methoxy-3'-(or 2')-bromophenyl)-anthraquinone, 1,5-dihydroxy-4,8-diamino-6-(or 7)-bromo-2- or 4-(4'-methoxy-3'(or 2')-bromophenyl)-anthraquinone, and also 1,5-dihydroxy-4,8-diaminoanthraquinones containing, in 2-position or 3-position, the residue of a 2,3-dihydrobenzthiophene, a 2,2-dimethyl-3-hydrobenzofuran, a 2-methyl-2,3-dihydrobenzofuran, a 2,5- or 2,7-dimethyl-2,3-dihydrobenzofuran or a 2-methyl-7-chloro-2,3-dihydrobenzofuran bound in 5-position, or the residue of a 2,2,3- or 2,2,4-trimethylchroman, a 2,2,4-trimethyl-3,4-dehydrochroman or a 2,3-benz-1,4- or 1,5-dioxane bound in 6-position.

These compounds can be obtained, for example, by the addition of a hydroxybenzene or alkoxybenzene to a boric acid ester of 1,5-dihydroxy-4,8-diaminoanthraquinone-2,6-disulphonic acid dissolved in concentrated sulphuric acid in accordance with German patent specification No. 445,-269, issued June 7, 1927, to I.G. Farbenindustrie A.G. Frankfurt am Maim, Germany, boiling the addition product in an acidic aqueous solution or heating it at 20 to 60° C. in an alkaline solution, whereby a sulphonic acid group is split off, in accordance with German patent specification No. 446,563, issued July 6, 1927, to I.G. Farbenindustrie A.G. Frankfurt am Maim, Germany, and the sulphonic acid group still present is eliminated by reduction. If necessary, the 1,5-dihydroxy-4,8-diamino-2-phenylanthraquinone is treated with an alkylating and/or acylating agent, for example, ethyl bromide, ethyl chloride, ethylene chlorohydrin or benzyl chloride, also alkylsulphonic acid esters, for example, para-toluene-sulphonic acid methyl ester, alkyl sulphates, for example, dimethyl or diethyl sulphate, aldehydes, especially formaldehyde, alkylene oxides, for example, ethylene oxide, chloroformic acid chloroethyl ester, chloroformic acid-$\beta$-chloroisopropylester, chloroformic acid-1-phenyl-2-chloroacetyl ester or epichlorohydrin, acetic anhydride or benzoyl chloride. Compounds in which the aryl residue is bound in 3-position are obtainable by the process described in Belgian patent specification No. 627,010, granted on Jan. 11, 1963, to Farbenfabriken Bayer A.G., Leverkusen-Bayerwerk, Germany.

It is also possible to obtain the starting materials used in the process of the invention by reacting a 1,5-dihydroxy-4,8-diamino-2-aryl-anthraquinone-6-sulphonic acid with phosphorous pentachloride or with chlorosulphonic acid.

The sulphonic acid halides mentioned above are reacted with ammonia or with an amine of the formula $HNR_3R_4$, that is to say, for example, with methylamine, ethylamine, ethanolamine, propylamine, butylamine, cyclohexylamine, benzylamine, aniline, dimethylamine, diethylamine, dibutylamine, N-methylaniline, pyrrolidine, piperidine, morpholine, 2-cyanoethylamine, bis-(2-cyanoethyl)-amine, diethanolamine (it being possible to acylate the hydroxyl group subsequent to the reaction), ethyleneimine, N,N-dimethylpropylenediamine-(1,3), N-methylaniline, bis-(2-methoxyethyl)-amine, dissopropylamine, N-methylpiperazine and N-hydroxyethylpiperazine.

Reaction between the sulphohalide and the amine is effected, for example, in an organic solvent, for example, in nitrobenzene, alkylene chloride or pyridine, or in an excess of a dialkylamine, but preferably in an aqueous suspension or in the presence of acetone. To prevent hydrolysis of the sulphonic acid halide groups, condensation is advantageously carried out at a relatively low temperature, for example, at a temperature within the range of from 0 to 80° C. In certain cases it is expedient to carry out the condensation process at a temperature below 0° C.

In order to produce mixtures of dyestuffs, which are especially valuable, it is possible either to mix the prepared dyestuffs or to produce the mixtures in situ by reacting a mixture of the sulphochlorides of the anthraquinone dyestuffs described above which are used as starting materials and/or by using a mixture of different amines.

The new dihydroxydiaminoanthraquinones or the mixtures thereof are valuable dyestuffs which possess excellent affinity for polyester fibres, especially polyethylene terephthalate fibres and which dye the said fibres pure blue to greenish blue tints possessing an excellent fastness to light and to sublimation. The new dyestuffs also possess good building-up properties and ensure a good reservation of cotton.

For dyeing, the new dyestuffs are advantageously used in a state of fine division, and dyeing is carried out in the presence of a dispersing agent, for example, soap, sulphite cellulose waste liquor or a synthetic detergent, or a combination of different wetting and dispersing agents. Prior to dyeing, it is generally advantageous to convert the dyestuff into a dyeing preparation which contains a dispersing agent and the dyestuff in a form such that a fine dispersion is formed when the dyestuff preparation is diluted with water. Dyestuff preparations of the kind defined can be obtained by a method known per se, for example, by reprecipitating the dyestuff from sulphuric acid and grinding the suspension so obtained with sulphite cellulose waste liquor or, if desired, by grinding the dyestuff in the dry or wet state in a highly efficient grinding device in the presence or absence of a dispersing agent.

The new dyestuffs are also suitable for application by the so-called thermofixation process in which the fabric to be dyed is impregnated at a temperature preferably not exceeding 60° C. with an aqueous dispersion of the dyestuff which advantageously contains 1 to 50 percent of urea and thickening agent, especially sodium alginate, and then squeezed in the usual manner. Squeezing is advantageously carried out in a manner such that the amount of dye liquor which the fabric retains is of the order of 50 to 100 percent of its dry weight.

To bring about fixation of the dyestuff, the fabric so impregnated is heated to a temperature above 100° C., for example, to a temperature within the range of from 180 and 220° C., preferably subsequent to a drying process, for example, in a current of warm air.

The dyeings so obtained are advantageously subjected to an aftertreatment, for example, by heating with an aqueous solution of a nonionic detergent.

The dyestuffs may also be applied by printing techniques. In this method of application a printing paste is used which contains, for example, in addition to the usual printing adjuvants, for example, wetting and thickening agents, the finely divided dyestuff, if necessary, in admixture with one of the above-mentioned cotton dyestuffs, if necessary, in the presence of urea and/or an agent capable of binding acid.

The new dyestuffs can also be used in the spin-colouration of polyamides, polyesters and polyolefins. The polymer to be coloured is advantageously admixed with the dyestuff in the form of a powder, grains or chips, in the form of a solution ready for spinning or in the molten state, the dyestuff being either in the dry state or in the form of a dispersion or a solution in a solvent which may be volatile. When the dyestuff has been homogeneously dispersed in the polymer solution or melt, the mixture is processed by a method known per se, for example, by casting, compression moulding or extrusion into fibres, yarns, monofilaments, and films.

The new dyestuffs are also suitable for use in the manufacture of lacquers and inks, especially inks for ball-point pens.

The following examples illustrate the invention. Unless otherwise stated, the parts and percentages are by weight.

EXAMPLE 1

2 parts of 1,5-dihydyroxy-4,8-diamino-2-(4'-methoxyphenyl)-anthraquinone are dissolved in 50 parts by volume of freshly distilled chlorosulphonic acid. The temperature of the mixture rises to 35° C. and it turns green.

The mixture is then stirred overnight at room temperature. It is then discharged on to 1 kg. of ice, filtered, and the filter residue is washed until the washings run neutral. The moist product is introduced into 20 parts by volume of a 40 percent aqueous methylamine solution, and the whole is kept at a gentle boil for 30 minutes. The batch is then diluted with water filtered, and the filter residue is washed and dried; 2.3 parts of a dyestuff are obtained which dyes polyester fibres blue tints possessing an excellent fastness to light and to sublimation.

Dyeing prescription 1 part of the dyestuff obtained by the method described in the preceding paragraph is ground wet with 2 parts of a 50 percent aqueous solution of sulphite cellulose waste liquor and the batch is then dried.

The dyestuff preparation so obtained is mixed with 40 parts of a 10 percent aqueous solution of a condensation product derived from octadecyl alcohol and 20 mols of ethylene oxide, and then 4 parts of a 40 percent acetic acid solution are added. A dyebath of 400 parts is prepared therefrom by dilution with water.

100 parts of cleansed polyester fibre material are introduced into the dyebath so prepared at 50° C., the temperature is raised to a temperature within the range of from 120 to 130° C. during 30 minutes, and dyeing is carried out for one hour at that temperature in a closed vessel. The material is then well rinsed. A pure blue dyeing possessing an excellent fastness to light and to sublimation is obtained.

EXAMPLE 2

The procedure described in Example 1 is followed, but the methylamine solution is replaced by an equimolar amount of a 40 percent aqueous n-butylamine solution. The N-butylsulphonamide of 1,5-dihydroxy-4,8-diamino-2-(4'-methoxyphenyl)-anthranquinone is obtained. This dyesutff is actually fast to sublimation at a temperature as high as 210° C., it possesses a very good fastness to light, is suitable for application by the thermofixation process and dyes polyester fibres blue tints.

*Analysis.*—Calculated (percent): N, 8.2; S, 6.2. Found (percent): N, 7.8; S, 6.3.

EXAMPLE 3

The procedure described in Example 1 is followed, but 18.75 parts of 1,5-dihydroxy-4,8-diamino-2-(4'-methoxyphenyl)-anthraquinone and 94.3 parts by volume of chlorosulphonic acid are used. The still moist filter cake, which has been washed neutral, is added to a mixture of 250 parts by volume of acetone and 11.3 parts of N-methylcyclohexylamine and the whole is boiled for one hour under reflux in the presence of 4 parts of sodium bicarbonate. The batch is filtered, the filter residue is washed until the washings run colourless and then dried. 13.7 parts of a dyestuff are obtained which dyes polyester fibres blue tints possessing very good properties of fastness.

EXAMPLE 4

The procedure described in Example 3 is followed, but the N-methylcyclohexylamine is replaced by an equimolar amount of 2-chloro-para-phenylenediamine. A dyestuff is obtained which dyes polyester fibres blue tints.

EXAMPLE 5

The procedure described in Example 3 is followed, but the N-methylcyclohexylamine is replaced by an equimolar amount of N-hydroxyethyl-piperazine. A dyestuff is obtained which likewise dyes polyester fibres blue tints.

EXAMPLE 6

The procedure described in Example 3 is followed, but the N-methylcyclohexylamine is replaced by an equimolar amount of aniline. A dyestuff is obtained which dyes polyester fibres blue tints.

EXAMPLE 7

The procedure described in Example 3 is followed, but the N-methylcyclohexylamine is replaced by an equimolar amount of N-methyl-piperazine. A dyestuff is obtained which dyes polyester fibres blue tints.

EXAMPLE 8

1 part of 1,5-dihydroxy-4,8-diamino-3-(4'-methoxy)-phenyl-anthraquinone are dissolved in 40 parts by volume of chlorosulphonic acid at −10° C. This reaction mixture is stirred for 4 hours at a temperature within the range of from −10° C. and −5° C. The batch is then discharged into a mixture comprising 600 parts of ice, 80 parts of sodium chloride and 100 parts of water, filtered, and the filter residue is washed until the washings run neutral. The product so obtained is then boiled under reflux for 1 hour with 50 parts by volume of n-butylamine. The batch is then diluted with water, the excess amine is removed with steam, the batch is acidified and then filtered. The filter cake is washed and dried. 1.2 parts of a dyestuff are obtained which dyes polyester fibres blue tints possessing good properties of fastness.

EXAMPLE 9

A dyestuff having properties similar to those of the dyestuff described in Example 8 is obtained when the procedure described in Example 8 is followed but when the starting material used is a 1,5-dihydroxy-4,8-diamino-anthraquinone containing in 2-position the residue of a 2',2',4'-trimethylchroman bound in 6-position.

EXAMPLE 10

5.1 parts of a blue dyestuff were prepared as in Example 3. Instead of N-methylcyclohexylamine the equivalent amount of cyclohexylamine was used. The resulting dyestuff, 30 parts of nitrobenzene and a pinch of ferric chloride were heated at 50° C. A solution of 1.6 parts of bromine in 20 parts of nitrobenzene was added dropwise. The mixture was stirred for 3 hours at 50° C. Subsequently, the nitrobenzene was removed by steam-distillation, and the remaining water-insoluble dyestuff was filtered off and dried to give 5.4 parts of a blue dyestuff containing 12.5% of bromine.

In an analogous way the analogous dyestuffs which contained instead of the radical of cyclohexylamine the radicals of pyrrolidine, butylamine and morpholine were prepared and brominated to give water-insoluble blue dyestuffs.

What is claimed is:

1. A water-insoluble anthraquinone dyestuff of the formula

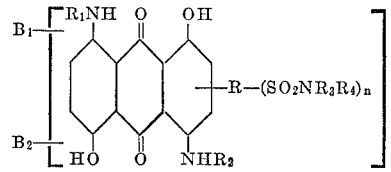

in which formula $n$ is at the least one and at the most 2, R is methylated chromane or thiochromane or phenyl substituted by up to 2 halogens, phenoxy, hydroxyl or alkoxy which has up to 11 carbon atoms, in the orthoposition or the paraposition to the anthraquinone moiety, $R_1$ and $R_2$ are a hydrogen atom or methyl, $R_3$ is a hydrogen atom, alkyl which has up to 4 carbon atoms, cyclohexyl, benzyl or phenyl and $R_4$ is a hydrogen atom, alkyl which has up to 2 carbon atoms, cyclohexyl or benzyl and in which $R_3$ and $R_4$, taken together with the nitrogen atom, form a heterocyclic ring selected from the group consisting of N-hydroxyethylpiperazine, pyrrolidine, morpholine and N-methylpiperazine and $B_1$ and $B_2$ are hydrogen, alkyl which has up to 2 carbon atoms, or halogen, said $B_1$ and $B_2$ being attached to nuclear carbon atoms.

2. A water-insoluble anthraquinone dyestuff as claimed in claim 1, wherein $n$ is 1.

3. Water-insoluble anthraquinone dyestuffs as claimed in claim 1, wherein $B_1$ and $B_2$ are each hydrogen atoms.

4. A water-insoluble anthraquinone dyestuff as claimed in claim 1 of the formula

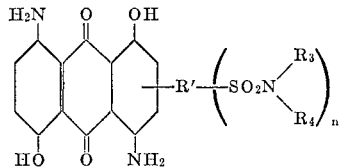

wherein $n$ is at least 1 and at most 2, $R^1$ is phenyl or alkoxylphenyl wherein alkoxyl is at most 6 carbons or halophenyl with up to two halogens.

5. A water-insoluble anthraquinone dyestuff as claimed in claim 4 of the formula

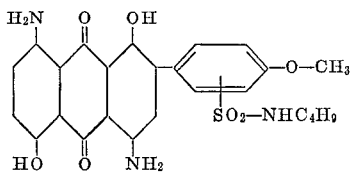

6. A water-insoluble anthraquinone dyestuff as claimed in claim 4 of the formula

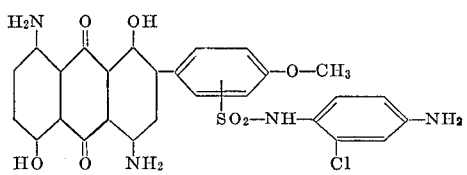

7. A water-insoluble anthraquinone dyestuff as claimed in claim 4 of the formula

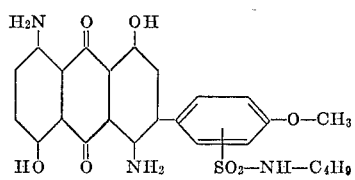

8. A water-insoluble anthraquinone dyestuff as claimed in claim 4 of the formula

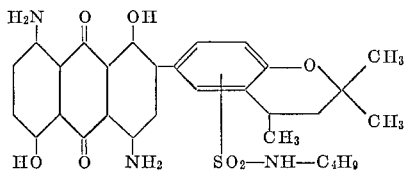

9. A water-insoluble anthraquinone dyestuff as claimed in claim 7 of the formula

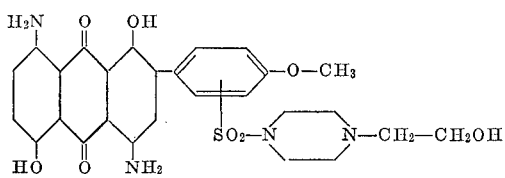

References Cited
UNITED STATES PATENTS

| | | | |
|---|---|---|---|
| 1,652,584 | 12/1927 | Schmidt | 260—373 |
| 2,225,061 | 12/1940 | Lodge | 260—373 |
| 2,586,233 | 2/1952 | Kern | 260—276 X |
| 2,730,534 | 1/1956 | Hoeble et al. | 260—374 X |
| 3,027,369 | 3/1962 | Hardy | 260—274 X |
| 3,125,586 | 3/1964 | Katz | 260—268 X |
| 3,265,709 | 8/1966 | Klemm | 260—329.2 |
| 3,270,013 | 8/1966 | Hindermann | 260—374 X |
| 3,274,198 | 9/1966 | Turetzky | 260—276 |
| 3,299,103 | 1/1967 | Maier | 260—373 |
| 3,394,133 | 7/1968 | Straley | 260—268 |
| 2,603,662 | 7/1962 | Stevens | 260—624 |
| 3,107,261 | 10/1963 | Gerber et al. | 260—453 |

DONALD G. DAUS, Primary Examiner

U.S. Cl. X.R.

8—55; 260—247.1, 272, 293.4, 326.82, 329.2, 340.7, 345.2, 346.2, 373, 374, 378, 381

PO-1050
(5/69)

UNITED STATES PATENT OFFICE
CERTIFICATE OF CORRECTION

Patent No. 3,530,132  Dated September 22, 1970

Inventor(s) JEAN-FREDERIC GUYE-VUILLEME

It is certified that error appears in the above-identified patent and that said Letters Patent are hereby corrected as shown below:

Column 8, line 13, change "claim 7" to --- claim 4 ---.

Signed and sealed this 11th day of May 1971.

(SEAL)
Attest:

EDWARD M. FLETCHER, JR.
Attesting Officer

WILLIAM E. SCHUYLER, JR.
Commissioner of Patents